(12) United States Patent
Horth

(10) Patent No.: US 10,942,314 B2
(45) Date of Patent: Mar. 9, 2021

(54) EDGE-COUPLER AND METHODS THEREOF

(71) Applicant: ELENION TECHNOLOGIES, LLC, New York, NY (US)

(72) Inventor: Alexandre Horth, Astoria, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/519,221

(22) Filed: Jul. 23, 2019

(65) Prior Publication Data

US 2021/0026074 A1 Jan. 28, 2021

(51) Int. Cl.
*G02B 6/30* (2006.01)
*G02B 6/02* (2006.01)

(52) U.S. Cl.
CPC ......... *G02B 6/305* (2013.01); *G02B 6/02042* (2013.01)

(58) Field of Classification Search
CPC .............................. G02B 6/305; G02B 6/02042
See application file for complete search history.

(56) References Cited

U.S. PATENT DOCUMENTS

| 9,759,864 | B2 | 9/2017 | Painchaud et al. |
| 10,197,731 | B2 * | 2/2019 | Teng ................... G02B 6/1228 |
| 10,197,734 | B2 * | 2/2019 | Painchaud ............... G02B 6/14 |
| 10,371,895 | B2 * | 8/2019 | Painchaud ........... G02B 6/1228 |
| 2014/0294341 | A1 * | 10/2014 | Hatori .................. G02B 6/1228 385/14 |
| 2017/0371102 | A1 | 12/2017 | Painchaud et al. |
| 2018/0224605 | A1 | 8/2018 | Painchaud et al. |

* cited by examiner

*Primary Examiner* — Sung H Pak
(74) *Attorney, Agent, or Firm* — Stratford Managers Corporation

(57) ABSTRACT

Disclosed herein are a photonic integrated circuit (PIC) including an edge coupler (EC) and method thereof. In some embodiments, the EC is optically coupled to a first waveguide at an inner end of the EC. In some embodiments, the PIC is in contact with an optical fiber at an outer end of the EC. The EC may include a plurality of waveguide cores located on a plurality of waveguide layers. The waveguide cores of the plurality of waveguide cores are located apart from each other and configured to adapt a mode size of a beam of light between a larger mode size at the outer end of the EC and a smaller mode size at the inner end of the EC.

15 Claims, 12 Drawing Sheets

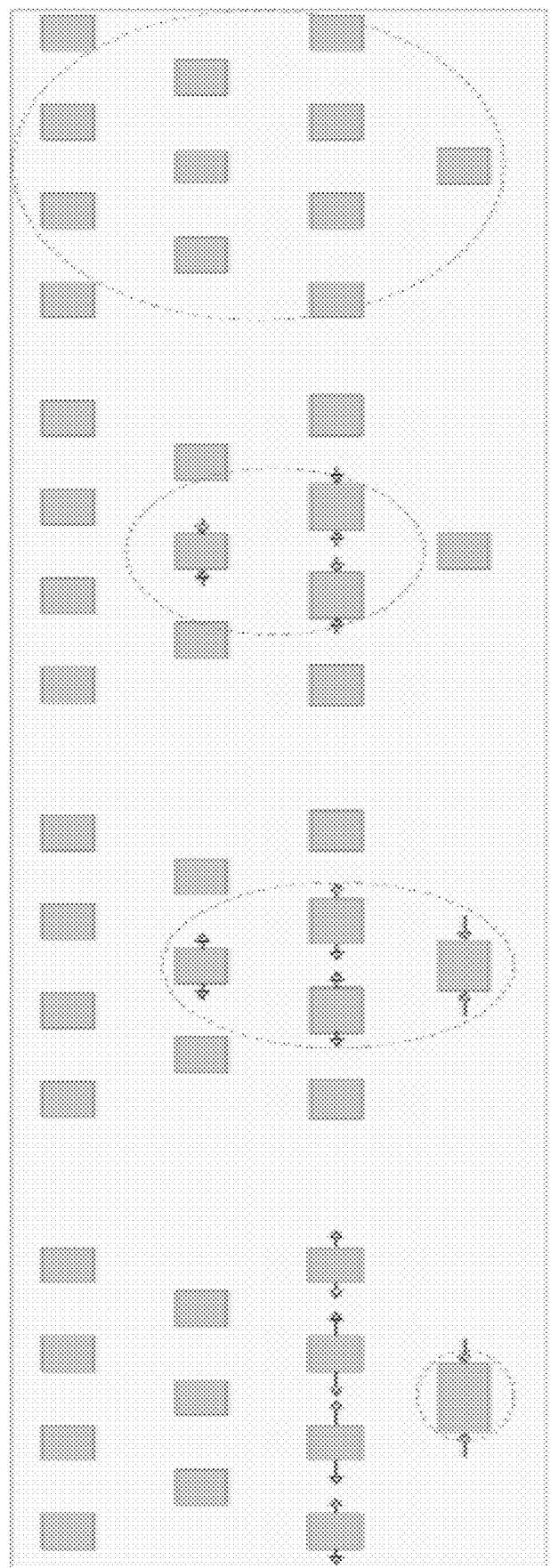

EDGE-COUPLER AND METHODS THEREOF

FIELD OF THE INVENTION

The present application is related to optical couplers in general and particularly is related to optical couplers that optically connect optical fibers and chips.

BACKGROUND

Compared to a standard single mode fiber, the mode area of a single mode waveguide in a high refractive index contrast platform is very small. This mismatch leads to high coupling losses between the waveguides. For example, by taking the ratio of the typical single mode waveguides and standard single mode fibers areas, the coupling loss might be in the order of 0.125% or 29 dB of mismatch loss. For practical applications this mode mismatch loss needs to be lower, smaller than 5 dB and ideally smaller than 1 dB. There are a few approaches that can be used to address this issue. One is to use specialty fibers whereby one can reduce the mode area of the fiber. There are multiple drawbacks with this approach including the price of specialty fiber and smaller aligning modes that result in a higher misalignment loss. Another approach is to use grating couplers; however, the grating couplers have insertion losses in the 3-6 dB range and are limited in bandwidth.

SUMMARY OF THE INVENTION

According to some embodiments, a photonic integrated circuit (PIC) including an edge coupler (EC) is disclosed. In some embodiments, the EC is optically coupled to a first waveguide at an inner end of the EC. In some embodiments, the PIC is in contact with an optical fiber at an outer end of the EC. The EC may include a plurality of waveguide cores located on a plurality of waveguide layers. The waveguide cores of the plurality of waveguides are located apart from each other and configured to adapt a mode size of a beam of light between a larger mode size at the outer end of the EC and a smaller mode size at the inner end of the EC.

In some embodiments, at least one of the waveguide cores expands from the inner end to the outer end of the EC. In some embodiments, the at least one expanded waveguide core is located at a middle of a surface transverse to a propagation direction of illumination in the EC. In some embodiments, the at least one expanded waveguide core is located at a bottom of a surface transverse to a propagation direction of illumination in the EC. In some embodiments, one or more of the waveguide cores that are not expanded, are located farther apart from each other near the outer end of the EC than near the inner end of the EC. In some embodiments, the at least one expanded waveguide core is surrounded by other waveguide cores.

In some embodiments, at least one waveguide core expands from the inner end to the outer end of the EC and one or more of a remaining waveguide cores tapers down towards the outer end of the EC. In some embodiments, one or more waveguide cores near edges of a surface transverse to a propagation direction of light in the edge coupler tapers down towards the outer end of the edge coupler.

In some embodiments, one or more of the waveguide cores remains unchanged from the inner end to the outer end of the edge coupler. In some embodiments, one or more waveguide cores tapers down towards the outer end of the edge coupler. In some embodiments, each of the waveguide cores has a same material composition. In some embodiments, at least one of the waveguide cores is comprised of a different material.

According to some embodiments, the effective index of the medium is reduced. In an embodiment, the refractive index is reduced to compensate for small variations in refractive index that might exist in the oxides due to variation in growth conditions. A uniform medium can be used for highly delocalized modes. In some embodiments, inclusion of waveguide cores is used which enables the effective index of the medium to reach above a level of expected refractive index variations in the cladding.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 5A-5E illustrate an exemplary edge coupler, in accordance to some embodiments.

DETAILED DESCRIPTION

Figure 1A:
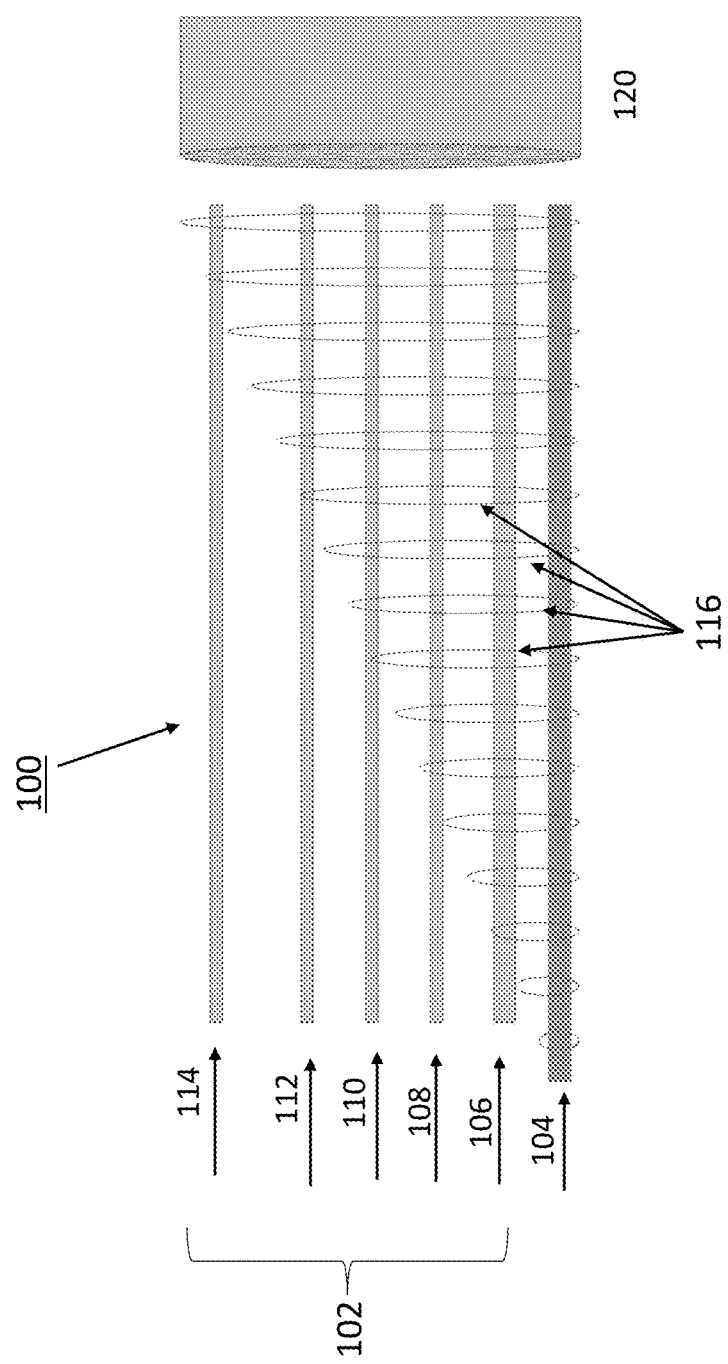
FIGS. 1A-1B illustrate an edge coupler, in accordance with some embodiments.

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

Waveguide modes are characteristics of a waveguide structure. A waveguide mode is a transverse field pattern which amplitude and polarization profiles remain constant along the longitudinal coordinate. A guided mode can exist only when a transverse resonance, e.g., x direction, condition is satisfied. For example, the repeatedly reflected wave has constructive interference with itself. The transverse resonance condition results in discrete values of propagation constant for guided modes identified by the mode number. Although the critical angles do not depend on the polarization of a wave, e.g., a beam of light, the phase shifts caused by the internal reflection at a given angle depends on the polarization. Therefore, transverse electric and transverse magnetic waves have different solutions for the transverse resonance condition. This leads to different propagation constants and different mode characteristics for a given mode number. There are phase shifts associated with the internal reflections in the lower and upper interfaces. These can be obtained from the phase angle of reflection coefficient for a transverse electric wave.

In general, waveguides usually include a longitudinally extended high refractive index optical medium, e.g. a core, confined between lower-index, e.g. oxide, cladding layers. A guided optical wave propagates in the core along its longitudinal direction. Waveguides can be categorized into two types: 1) nonplanar waveguides of 2D transverse optical confinement, in which the core of the waveguide is surrounded by cladding in all transverse directions, e.g. a channel waveguide or an optical fiber, or 2) planar waveguides, which have optical confinement in only one transverse direction, whereby the core is sandwiched between cladding layers only in one direction. Light can be guided by planar or rectangular waveguides, or by optical fibers. Waveguides are used as components in integrated circuits or as the transmission medium in local and long-haul communication systems.

Most waveguides used in device applications are nonplanar waveguides. For a nonplanar waveguide, the index profile is a function of both transverse coordinates x and y. There are different types of nonplanar waveguides that are differentiated by the distinctive features of their index profiles. Except for few special geometric structures, nonplanar waveguides do not have analytical solutions for their guided mode characteristics. Numerical methods, e.g., beam propagation method, are typically used for analyzing such waveguides.

The mode area of a single mode waveguide in a high refractive index contrast platform, e.g., silicon-on-insulator (SOI), is typically very small and on the order of 0.1 $\mu m^2$. In comparison, a standard single-mode fiber (SMF) has a mode field diameter (MFD) of ~10 $\mu m$ resulting in a mode area of ~80 $\mu m^2$; resulting in an estimated coupling loss of about 0.1/80=0.125% or 29 dB of mismatch loss. However, for practical applications this mode mismatch loss needs to be lower, smaller than 5 dB and ideally smaller than 1 dB.

An embodiment of the present application relates to reducing the coupling loss by using an edge coupler (EC) between an optical fiber and a photonic integrated circuit (PIC) chip. ECs may be lithographically defined on the PIC chip for expanding the mode of the light leaving the PIC chip and entering the optical fiber or vice versa for shrinking the mode of the light leaving the optical fiber and entering the PIC chip. One way to expand the mode is to use an inverted tapering waveguide EC, comprised of a plurality of waveguide cores arranged in a multi-layer stack. The multi-layer stack comprised of the laterally waveguide cores with cladding therebetween, and a plurality of cladding layers in between core layers. The waveguide cores may be patterned using silicon (Si), however, since Si has a high refractive index the practical mode-sizes achievable are on the order of 2-5 $\mu m$. The cladding sections and cladding layers may be comprised of a lower-index, dielectric and/or oxide material, e.g. $SiO_2$. Therefore, to achieve larger mode-sizes, the waveguide cores may be comprised of a lower index material, e.g. silicon nitride, oxynitrides, polymers, oxides, etc.

Depending on growth conditions, the layers of oxides may have refractive index (RI) variations which may affect the guided mode. Further, inverted tapering waveguides EC typically have a dimension that are at the limit of the achievable critical dimension of the process. In some instances, the near-critical dimension size makes the mode-size dependent on the exact size and/or width of the inverted waveguides. Disclosed is an EC, e.g. a "meta-coupler", design to reduce the coupler's sensitivity to variations in RI in the cladding, e.g. oxide, layers. In various embodiments, the EC relaxes the need for a small critical dimension and reduces the total footprint of the EC.

FIG. 1A illustrates a photonic integrated circuit (PIC) in accordance with some embodiments. The PIC 100 may include an edge coupler (EC) 102 and a first waveguide 104 in an optical device layer. In some embodiments, the PIC 100 may include a substrate (not shown). In some embodiments, the first waveguide 104 may be part of a n optical device layer over the substrate. In some embodiments, the EC 102 is optically coupled to the first waveguide 104 at an inner end of the EC 102. In some embodiments, the PIC 100 is optically coupled with an optical fiber 120 at an outer end of the EC 102. The EC 102 may include a plurality of horizontally waveguide cores located on waveguide layers, e.g., waveguide cores 106, 108, 110, 112 and 114 disposed in a plurality of vertically waveguide core layers. In some embodiments, the waveguide cores are equally spaced apart. In some embodiments, the waveguide core layers are equally spaced apart. In some embodiments, one or more of the waveguide core layers, e.g. an upper most layer, is spaced apart by a different, e.g. larger, spacing. In some embodiments, the waveguide cores in one waveguide core layer are offset from waveguide cores in the adjacent waveguide cores layer, e.g., above and below. In some embodiments, the EC 102 has four waveguide layers. In some embodiments, the EC 102 has more than four waveguide layers. The waveguide cores of the EC102 are located apart from each other and configured to adapt a mode size of a beam of light between a larger mode size at the outer end of the EC 102 and a smaller mode size at the inner end of the EC 102.

In some embodiments, the plurality of waveguide cores expands the mode, illustrated by circles 116 in FIG. 1A and rest of drawings, of the light leaving the PIC 100 and entering the optical fiber 120 or vice versa. In some embodiments, the EC 102 reduces the coupling loss between the PIC 100 and the optical fiber 120. FIG. 1A illustrates how the mode, e.g., circles 116, expands in a quasi-linear fashion through the EC 102. The entering beam of light is tightly bound to the first waveguide 104 and, as it passes through the waveguide cores, e.g. 106, 108, 110, 112 and 114, the beam of light expands through the EC 102 in the propagation direction of illumination.

Figure 1B:
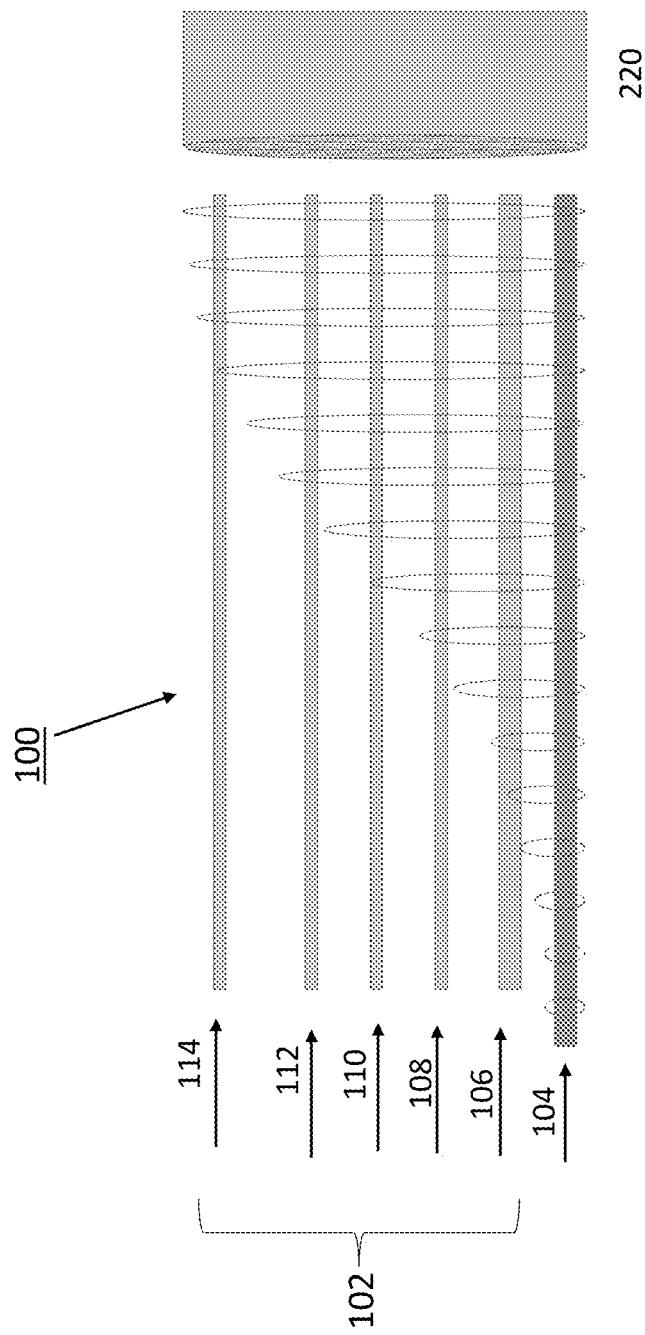

FIG. 1B illustrates expansion of the mode size in a cubic fashion in which vertices of a cubic function are located at the inner end, e.g., the first waveguide 104, and the outer end, e.g., the optical fiber interface, respectively. Vertical circles 116 depict approximately how the mode evolves with the cubic expansion though the EC 102. In some embodiments, the mode expands strongly at the center of the EC 102, and the expansion tapers near the optical fiber 120 interface. In some embodiments, the expansion scheme could use a parabolic function or some other high order function.

In some embodiments, the first waveguide 104 is a silicon (Si) layer. In some embodiments, the plurality of waveguide cores, e.g. 106, 108, 110, 112 and 114, is comprised of silicon nitride (SiN). In some embodiments, the plurality of waveguides is comprised of other types of dielectric, e.g., silicon oxynitride. In some embodiments, a nearest neighboring waveguide core of the first waveguide 104 is 200 nanometers thick. In some embodiments, the nearest neighboring waveguide core of the first waveguide 104, i.e. the bottom most waveguide core 106 in FIG. 1A, is about 150 nanometers to about 350 nanometers thick. In some embodiments, other waveguide cores, e.g., waveguide cores 108, 110, 112 and 114 in FIG. 1A, are about 100 nanometers to about 160 nanometers thick. In some embodiments, the other waveguide cores, e.g., waveguide cores 108, 110, 112 and 114 in FIG. 1A, are 150 nanometers to about 250 nanometers thick.

In order to decrease the coupling loss between the PIC 100 and the optical fiber 120, the mode size of the beam of light at the outer end of the EC 102 should be as close as possible to the mode size of the beam of light at the optical fiber 120, e.g., the mode sizes at the optical fiber interface should match. To that end, the plurality of waveguide cores, e.g. 106, 108, 110, 112 and 114, is so arranged to adapt the mode size of the beam of light throughout the EC 102. The adaptation is performed by tailoring the architecture of the waveguide cores. This tailoring takes place by at least one of the: changing one or more pitches between two or more of the waveguide cores, expanding one or more of the waveguide cores from the inner end to the outer end of the EC 102, changing a number of waveguide cores from the inner end to the outer end of the EC 102, or tapering down one or more of the waveguide cores between the inner end and the outer end of the EC 102.

Figure 2A:
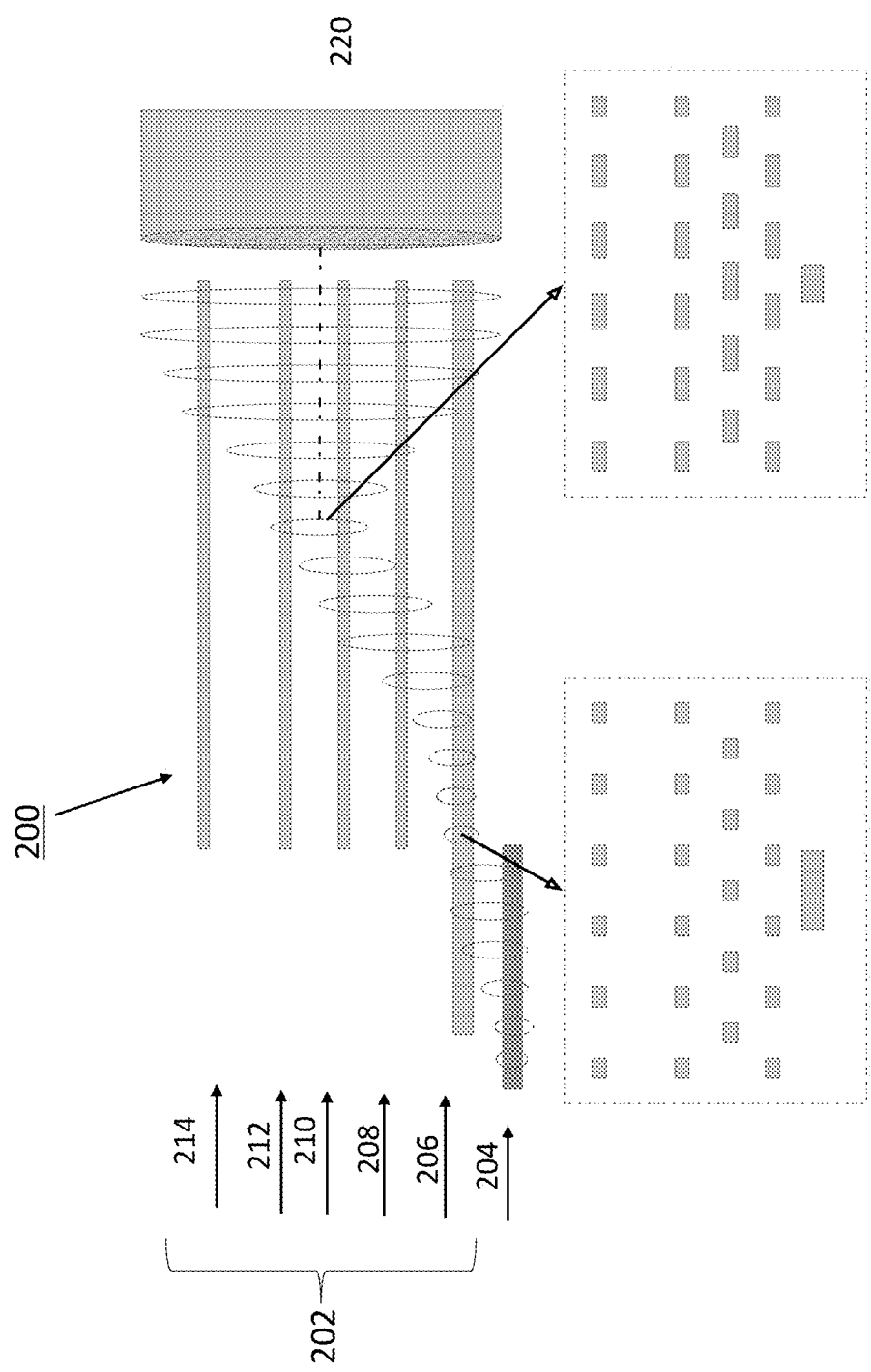
FIGS. 2A-2B illustrates an edge coupler and the waveguide cores, in accordance with some embodiments.
Figure 2B:
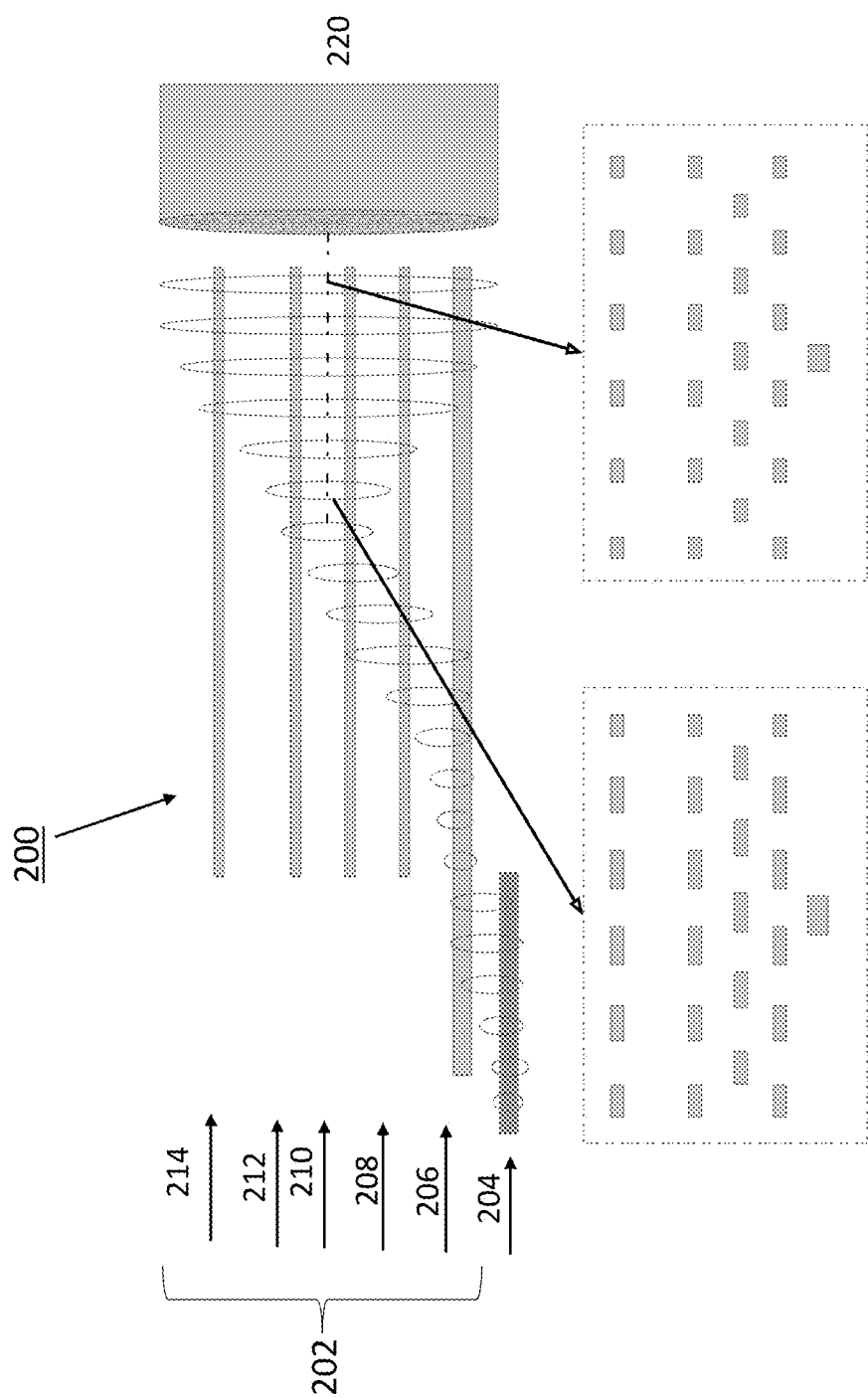

Referring to FIGS. 2A-2B, in some embodiments, the mode is first shifted vertically to a centric position with regards to the optical fiber's axis. Once a location of the mode is fixed, the mode size expands to match the optical fiber mode size. In some embodiments, the first waveguide 204 is made of Si with the index of refraction of about 3.5. The plurality of waveguide cores, e.g., waveguide cores 206, 208, 210, 212, 214, etc. shifts the mode of the beam of light vertically towards a position that is more centric to the propagating axis of the optical fiber 220. The goal is to align the super mode with the optical fiber's axis. The super mode is spread across multiple layers. Mode-matching is achieved by tapering the waveguide cores or by increasing the distance between the waveguides. In some embodiments, the EC 202 is about 200 microns to about 400 microns long. Position and dimension of the plurality of waveguide cores along the EC 202 and at the optical fiber interface are illustrated in FIGS. 2A-2B.

FIG. 2A illustrates evolution of the mode of the beam of light in the first half of the PIC 200, e.g., from the inner end of the EC 202 to a middle of the EC 202, according to some embodiments. As the beam of light is tightly bound to the first waveguide 204, due to high refractive index of Si, first layer of the plurality of waveguide cores is so arranged to vertically shift the beam of light towards the bottom most waveguide core 206. To that end, the waveguide core 206 is tapered so a width of the waveguide core 206 is substantially larger than the other waveguide cores of the EC 202 at the inner end proximate the first waveguide 204 (see bottom left inset) and tapers down to a same width or smaller width than the other waveguide cores at the middle of the EC 202 (see bottom right inset), in some embodiments. This arrangement of the waveguide cores shifts the mode of the beam of light from the first waveguide 204 towards the waveguide core 206.

After shifting the mode of beam of light to the plurality of waveguide cores, it is vertically shifted from the waveguide core 206 at the bottom of the PIC 200 towards the middle of the plurality of waveguide cores, e.g. waveguide cores 210 and 212. The configuration of the plurality of the waveguide cores at the middle of the EC 202 is shown in the bottom right inset, according to some embodiments. As shown in the inset, in some embodiments, the waveguide core 206 is tapered down, e.g. the width and/or height, to enhance localization of the mode of the beam of light. In some embodiments, the other waveguide cores, e.g., the waveguide cores 208, 210, 212 and 214, are tapered to have larger widths. In some embodiments, the widths of the waveguide cores are substantially the same. In some embodiments, the widths of the waveguide cores are not the same. In some other embodiments, the pitches between the waveguide cores is also tapered.

FIG. 2B illustrates evolution of the mode of the beam of light in the second half of the PIC 200, e.g., from the middle of the EC 202 to the optical fiber interface, according to some embodiments. In some embodiments, in the region of the EC 202 near the center of the plane transverse to the propagation direction of illumination, e.g., in the middle of the EC 202, the mode of beam of light has vertically shifted towards the middle of the plurality of waveguide cores. The configuration of the plurality of the waveguide cores is shown in bottom left inset, according to some embodiments. In some embodiments, in the second half of the EC 202, while the mode substantially matches the mode of the optical fiber 220, the area tapers to larger modes with insignificant vertical movement.

The insets illustrate configuration of the waveguide cores, e.g. 206, 208, 210, 212 and 214, in the second half of the EC 202. In the second half of the EC 202, one or more of the plurality of waveguide cores, e.g. all of waveguide cores 206, 208, 210, 212 and 214, tapers to match the mode of the beam of light to the mode of the optical fiber 220. As depicted in the bottom right inset, all of the waveguide cores, e.g. 206, 208, 210, 212 and 214, at the optical fiber interface have substantially the same width. In some embodiments, the bottom most waveguide core 206 has a larger height compared to other waveguide cores.

Figure 3:
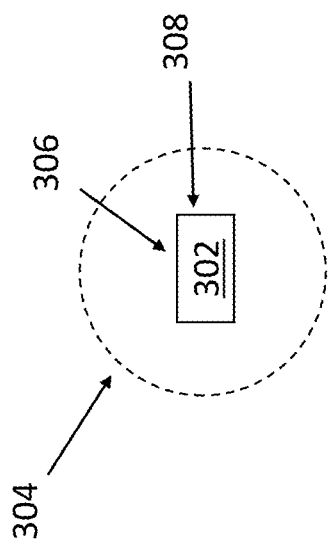
FIG. 3 illustrates a single waveguide core, in accordance to some embodiments.

FIG. 3 illustrates a single waveguide core 302. The dashed lines 304 depict a penetration depth of the single waveguide core 302. In general, when electromagnetic (EM) radiation is incident on a surface of a material, the EM radiation may be partly reflected from the surface and there will be a field containing energy transmitted into the material. The transmitted electromagnetic field interacts with the atoms and electrons inside the material, and, depending on the nature of the material, the electromagnetic field may travel far into the material or may fade out quickly. For a given material, a penetration depth generally is a function of wavelength and refractive index contrast between the core and cladding material. The penetration depth is a measure of how deep light or any electromagnetic radiation can penetrate into a material and is defined as the depth at which the intensity of the radiation inside the material falls to 1/e, e.g., about 37%, of its original value at the surface.

According to some embodiments, each waveguide core is smaller than about half an effective waveguide core size. The effective waveguide core size is $\lambda/n$, in which $\lambda$ is the wavelength, e.g., 1.55 nm, and n is the refractive index of the waveguide. For example, if the waveguide core is made of silicon nitride, e.g., refractive index ~2, the waveguide core has a dimension smaller than 1.55/(2·2)≅400 nm both in height and width. In some embodiments, multiple waveguide cores are positioned in close proximity, e.g., within the penetration depth, to form a larger medium. If the distance and width of each waveguide core is equal in all dimensions, then an effective medium is formed with controllable refractive index. In such embodiments, the effective medium's index can be controlled by controlling the density of waveguide cores, e.g., the higher the density of waveguide cores the larger is the medium's index.

In some embodiments, a width 306 of a single waveguide core 302 is smaller than a height 308 of the single waveguide core 302. In some embodiments, the width 306 is larger than the height 308. In some embodiments, the width 306 is equal to the height 308.

FIGS. 4A-4D illustrate how the waveguide cores may be tailored along the EC 102 or 202 in order to shift the mode of the beam of light to the centric position and expand the mode size to match the mode size of the optical fiber 120 or 220. The following discloses various configurations that may be used to facilitate mode-match at the optical fiber interface.

Figure 4A:
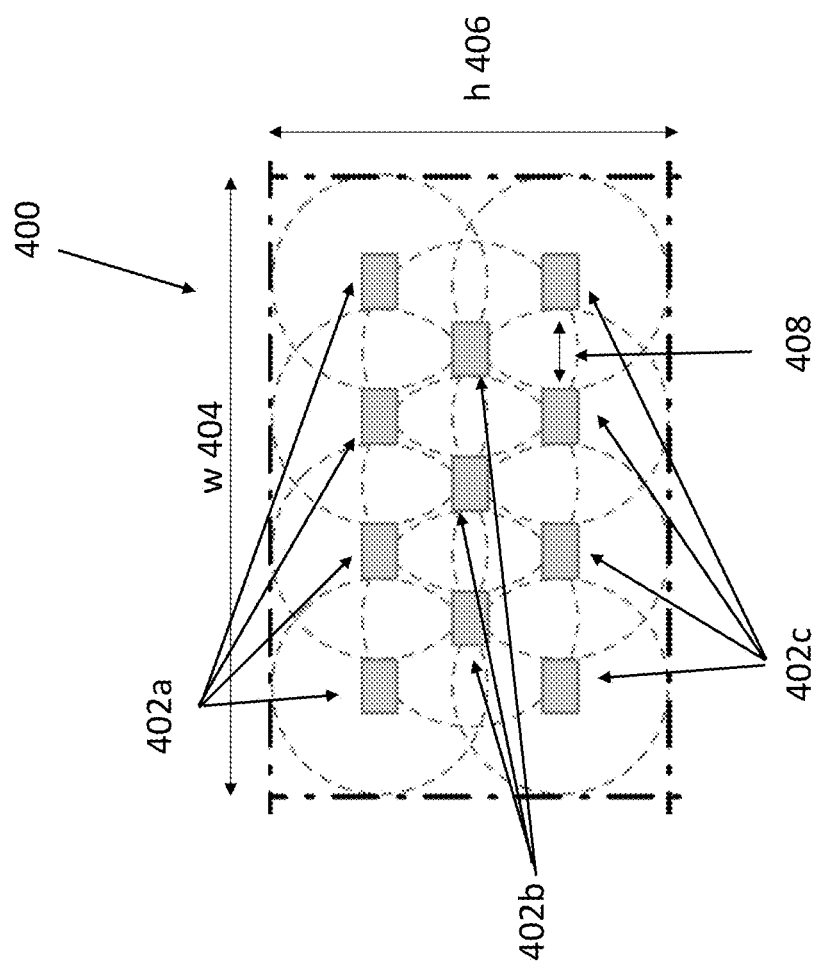
FIGS. 4A-4E illustrate a plurality of waveguide cores, in accordance with some embodiments.

As FIG. 4A illustrates, in some embodiments, the plurality of waveguide cores, e.g., waveguide cores 402a, 402b and 402c, of the edge coupler 400 is confined to a predetermined area transverse to a propagation of light. The confinement area has a width 404, w, and a height 406, h. In some embodiments, a distance 408 between neighboring waveguide cores, e.g. in the same layer and/or in adjacent layers, is same for all of the waveguide cores. In some embodiments, waveguide cores, e.g. in the same layer and/or in adjacent layers, are located at different distances. In some embodiments, the distance 408 between the waveguide cores is equal to the penetration depth. In some embodiments, the distance 408 between the waveguide cores is less than the penetration depth. FIG. 4A illustrates an example in which three rows of equally spaced and equally sized waveguide cores 402a, 402b and 402c are provided, e.g. at the outer end of the EC 102 or 202 proximate the optical fiber 120 or 220. The middle row of waveguide cores 402b may be laterally offset in order to interleave the waveguides and create a more uniform medium.

Figure 4B:
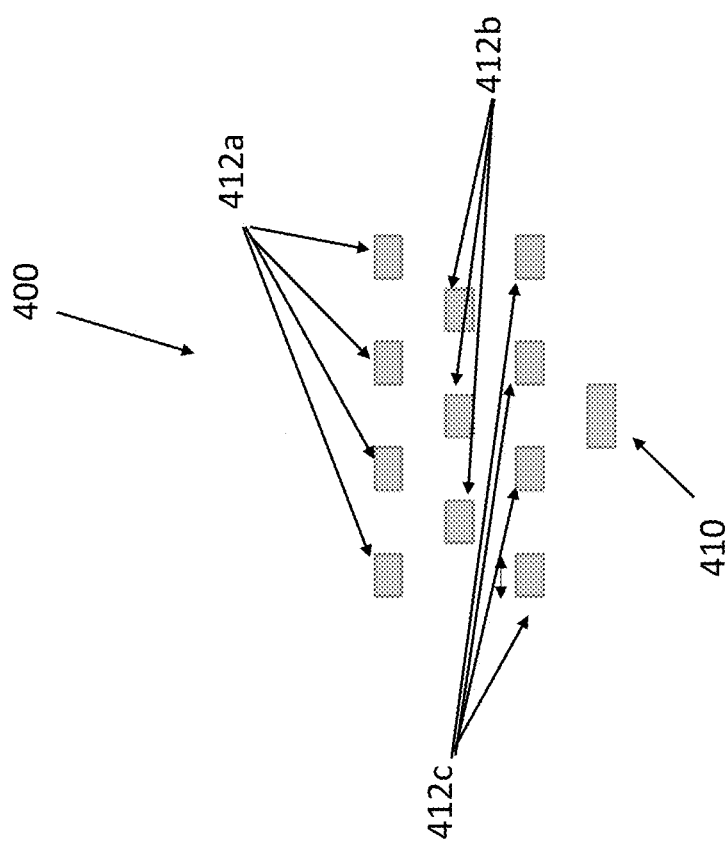

In some embodiments, at least one of the waveguide cores is tapered. FIG. 4B illustrates an embodiment in which the bottom most waveguide core 410 is tapered from the inner end proximate the device layer to the outer end proximate the optical fiber 120 or 220, as in FIGS. 2A and 2B. In some embodiments, the other waveguide cores, e.g., waveguide cores 412a, 412b and 414c, are not tapered. In some embodiments, a width of the waveguide core 410 is increased, while the widths of other waveguide cores 412a, 412b and 412c are unchanged. This tapering localizes the mode to the tapered waveguide core 410 for transfer to the first waveguide, e.g. 104 or 204. In some embodiments, by tapering or expanding one or more waveguide cores near the center of a plane transverse to the propagation direction of the illumination, e.g. waveguide cores 412b, the mode of the beam of light can be shifted to the center of the edge coupler. In some embodiments, more than one waveguide core is tapered or expanded. In some embodiments, one or more waveguide cores near the center of the edge coupler are tapered. In some embodiments, one or more waveguide cores near the edges of the edge coupler are tapered, while the width of one or more waveguide cores near the center are expanded.

Figure 4C:
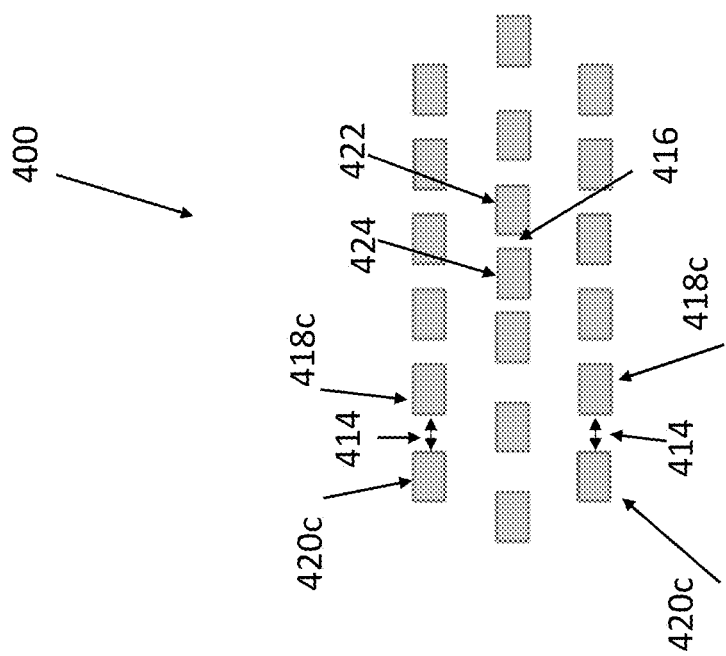

Referring now to FIG. 4C, in some embodiments, a distance, e.g. pitch, between at least two of the neighboring waveguide cores is changed from the inner end to the middle or the outer end or the EC 102 or 202. The distance may be decreased or increased. In some embodiments, the decreased distance, e.g., increased density of waveguide cores, causes the mode to shift towards the region with higher density of waveguide cores. In some embodiments, the decreased distance causes the mode size of the beam of light to expand. In some embodiments, the distance between two or more of the waveguide cores is increased. In some embodiments, increasing a distance between two or more of the waveguide cores and decreasing a distance between two or more other waveguide cores can take place at the same time. In some embodiments, a distance 414 between neighboring waveguide cores farther from the middle, e.g. upper 418a or lower 418c waveguide cores and corner waveguide cores 420a and 420c, is larger than a distance 416 between neighboring waveguide cores near the center of the edge coupler, e.g. between outer middle waveguide cores 422 and center waveguide core 424.

Figure 4D:
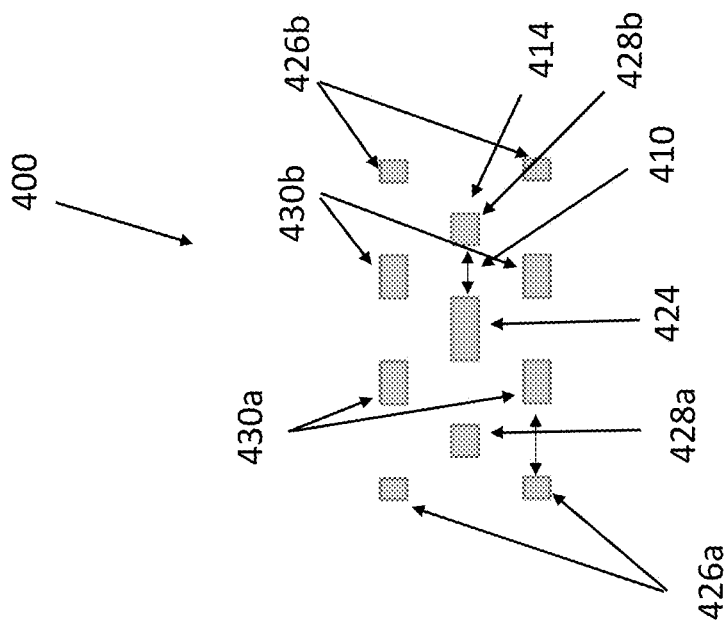

Referring now to FIG. 4D, in some embodiments, the center waveguide core 424 is tapered to have a larger width, thus increase in size to a larger cross section, than the other waveguide cores, as the EC progress from the optical fiber to the middle or the first waveguide on the device layer. This can create a core region around the center of the plurality of waveguide cores. In some embodiments, some of the waveguide cores farther away from the center of the plane of the plurality of waveguide cores, e.g. waveguide cores 426a and 426b, may be tapered to decrease in size to a smaller cross section proximate middle or the inner end. Outer middle tapered waveguide cores 428a and 428b farther away from the center of the plurality of waveguide cores may have larger sizes than the corner waveguide cores 426a and 426b at the bottom and top corners, but smaller sizes than upper and lower middle tapered waveguide cores 430a and 430b closer to the center of the plurality of waveguide cores. In various embodiments, the size of different waveguide cores is limited to the effective waveguide core size, as mentioned previously.

Figure 4E:
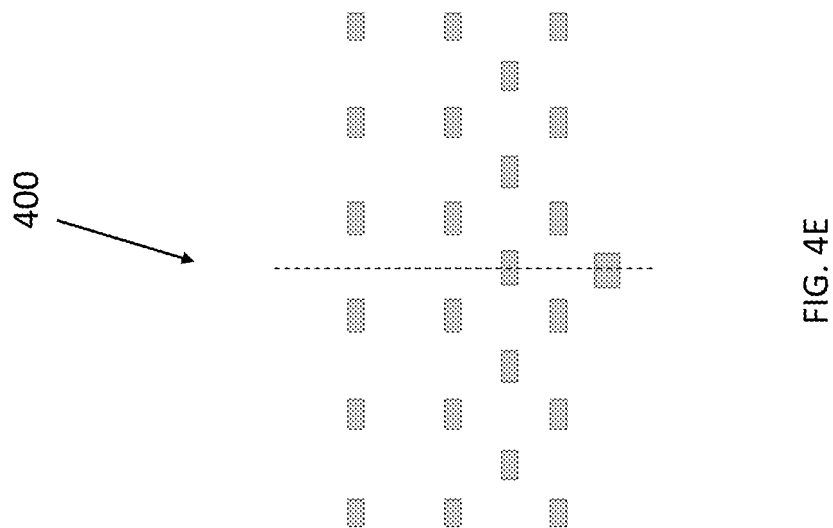

FIG. 4E illustrates a cross-section view of the edge coupler at the optical fiber interface. At this stage, the mode of the beam of light entering the edge coupler has shifted towards the center of the plane transverse to the propagation direction of illumination and the mode size is substantially matched to the mode size of the optical fiber. The dashed lines are used to show the symmetrical configuration of the plurality of waveguide cores at the optical fiber interface.

By tapering the widths of at least one of the waveguide cores along the EC a tolerance of fabrication imperfection is increased. In some embodiments, in which all the waveguide cores have the same width, a small change in the widths of one or more of the waveguide cores would result in a local change of waveguide density followed by a shift in the position of the super-mode to where the density is the highest. In some embodiments, tapering the widths ensures the highest density to be located in the center.

In some embodiments, at least one of the waveguide cores expands from the inner end to the outer end of the EC. In some embodiments, the at least one expanded waveguide core is located at a middle of a surface transverse to a propagation direction of illumination in the EC. In some embodiments, the at least one expanded waveguide core is located at a bottom of a surface transverse to a propagation direction of illumination in the EC. In some embodiments, one or more of the waveguide cores that are not expanded, are located farther apart from each other near the outer end of the EC than near the inner end of the EC. In some embodiments, the at least one expanded waveguide core is surrounded by other waveguide cores.

In some embodiments, at least one waveguide core expands from the inner end to the outer end of the EC and one or more of a remaining waveguide cores taper down towards the outer end of the EC. In some embodiments, one or more waveguide cores near edges of the surface transverse to a propagation direction of illumination in the edge coupler taper down towards outer end of the edge coupler.

In some embodiments, one or more of the waveguide cores remain unchanged from the inner end to the outer end of the edge coupler. In some embodiments, one or more waveguide cores taper down towards the outer end of the edge coupler.

In some embodiments, each of the waveguide cores has a same material composition. In some embodiments, at least one of the waveguide cores is comprised of a different material.

In some embodiments, a distance, e.g., a pitch, between at least two of adjacent waveguide cores is tapered. In some embodiments, the waveguide cores at the outer end of the edge coupler are closer to each other than at the inner end of the edge coupler. In some embodiments, each waveguide core includes a dielectric or semiconductor material enabling illumination of a desired wavelength. In some embodiments, the semiconductor or dielectric material is selected from a group consisting of crystalline silicon, poly-silicon, amorphous silicon, silicon, silicon nitride, silicon oxynitride, silicon dioxide, doped silicon dioxide, and a polymer.

According to some embodiments, the effective index of the medium is reduced. In an embodiment, the refractive index is reduced to compensate for small variations in refractive index that might exist in the cladding, e.g. oxides, due to variation in growth conditions. In some embodiments, a uniform medium is used for highly delocalized modes. In some embodiments, inclusion of waveguide cores enables the effective index of the medium to reach above the level of expected refractive index variations in the cladding and further creates a more uniform medium.

In various embodiments, tapering the waveguides is used to engineer the interface of the EC and the optical fiber. In various embodiments, the size of different waveguides is limited to the effective waveguide size, as mentioned previously.

In some embodiments, tapered waveguide cores with different materials than other waveguides are used. For example, a material with higher refractive index may be used in waveguide cores near the centric region of the EC. In some embodiments, materials with higher refractive index are used to create discontinuity in the medium, e.g., by adding waveguide cores to the central core region or removing waveguide cores from regions far from the central core region. In various embodiments, a combination of any of the disclosed methods can be used.

Figure 5A:
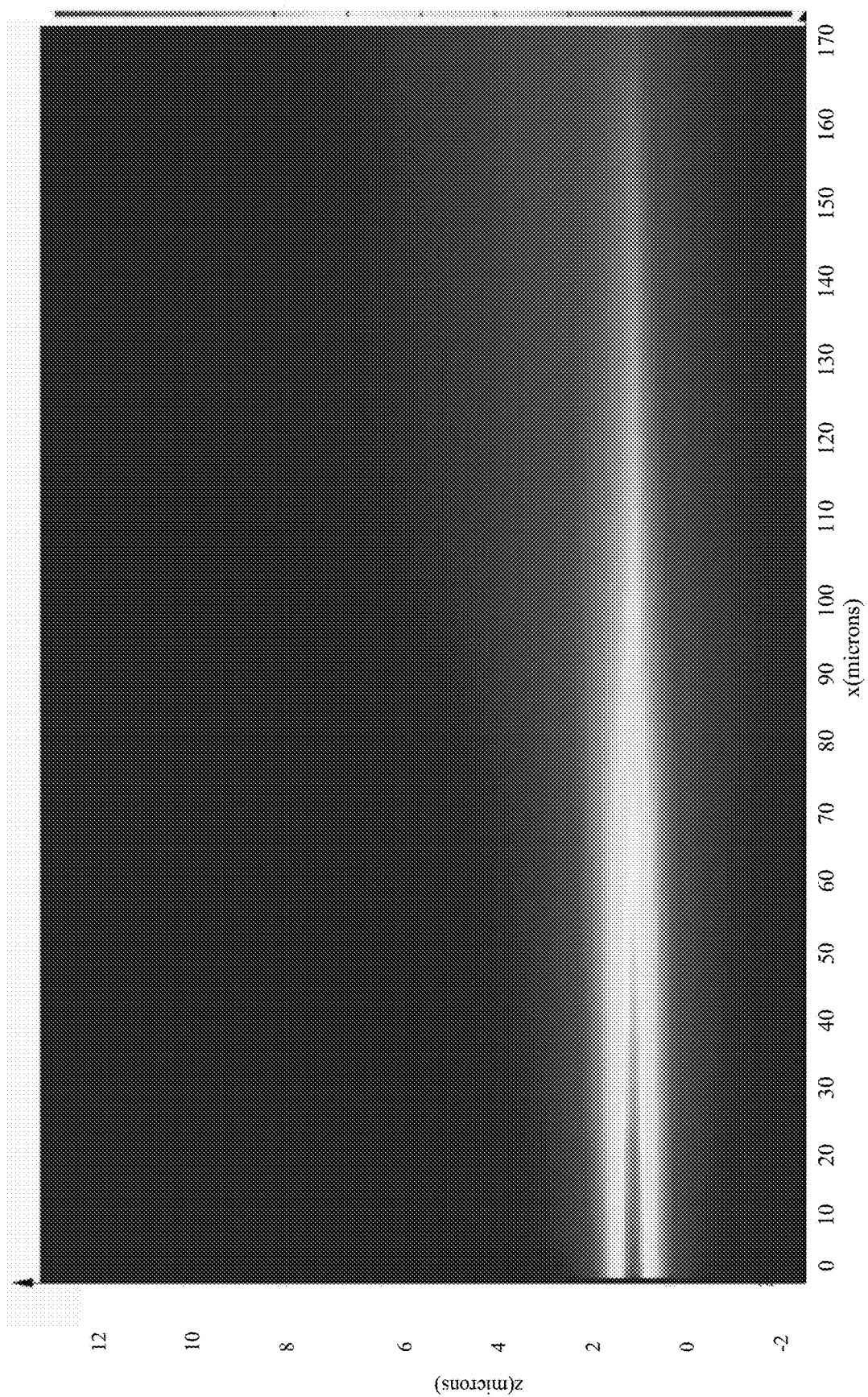

FIGS. 5A-5E illustrate an example EC according to one embodiment of the present application. The example shows a transition from a highly delocalized mode to a highly localized mode. Such highly localized mode is observed in the silicon device layer of a Silicon-On-Insulator (SOI) waveguide. The length of the edge coupler is shortened by selectively tapering some of the waveguide cores in the plurality of waveguide cores. FIG. 5A illustrate a simulated cross-section of a 160 micrometers edge coupler. FIG. 5B shows a starting point to the edge coupler, e.g., at the inner end, where the bottom most waveguide core is so tapered that it is substantially larger, e.g., 0.8-1.2 micrometers, than the other waveguide cores, e.g., 0.2-0.3 micrometer. Thus, the mode which is depicted by the dotted lines, is tightly confined to the larger waveguide, e.g., a highly confinement region.

In FIG. 5C, the width of the bottom most waveguide core is tapered down. At the same time, three other waveguide cores in close proximity to the bottom most waveguide core are tapered up, e.g., expanded. The tapering and expansion of waveguide cores enables the effective index of the plurality of waveguide cores to remain large and limits the extend of the mode to the three waveguide cores and the bottom most waveguide core that possess larger widths. Subsequently, radiation losses and/or coupling losses to high-order modes are reduced.

Referring to FIG. 5D, the bottom most waveguide core is now near its final width while more waveguide cores above and about centric to the edge coupler still have larger widths than the surrounding waveguide cores, therefore limiting the extent of the mode to the larger waveguide cores. In FIG. 5E, an optimized geometry for coupling to the mode-match waveguide is achieved, e.g., such as a 10 micrometers MFD fiber, by tapering the enlarged waveguide cores back down to approximately their original size and the same size as the surrounding waveguide cores. The central waveguide core may even be reduced to less than the original and surrounding widths to encourage expansion to the outermost waveguide cores. FIG. 5A shows that using the configuration of waveguide cores of this embodiment enables reducing footprint of the edge coupler down to ~150-200 micrometers. Further, efficiency comparable to a 400-500 micrometers long edge coupler that does not use interleaved tapering of the waveguide cores is achieved. The diagram depicts the mode expansion through a 160 micrometers edge coupler optimized for 10 micrometers optical fiber coupling. At x=0 a high-confinement region is shown which is at the inner end of the edge coupler. At x=160 the full mode expansion is achieved which is at interface of the edge coupler with the optical fiber. Mode-conversion loss from 5B to 5E are all smaller than 0.2 dB for both polarizations.

In an SOI, the core layer is made of silicon, according to some embodiments. A silica layer under the core layer is used for lower cladding. In some embodiments, air on top acts as the top cladding layer. A tightly confined waveguide mode is achieved because of large index difference.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for fabricating the layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A photonic integrated circuit (PIC) comprising:
   a substrate;
   an optical device layer supported over the substrate including a first waveguide; and
   an edge coupler, located above the optical device layer, comprising a plurality of waveguide cores located on a plurality of waveguide layers, the plurality of waveguide cores configured to adapt a beam of light between a larger mode size at an outer end of the edge coupler and a smaller mode size at an inner end of the edge coupler optically coupled to the first waveguide;
   wherein at least one of the plurality of waveguide cores expands from the inner end to the outer end of the edge coupler;
   wherein at least one of the plurality of waveguide cores tapers down towards the outer end of the edge coupler; and
   wherein at least one of the plurality of waveguide cores has an unchanged width from the inner end to the outer end of the edge coupler.

2. The PIC according to claim 1, wherein the at least one of the plurality of waveguide cores that expands from the inner end to the outer end is located at a middle of a surface transverse to a propagation direction of illumination in the edge coupler.

3. The PIC according to claim 1, wherein one of the plurality of waveguide cores that tapers is located at a bottom of a surface transverse to a propagation direction of illumination in the edge coupler.

4. A photonic integrated circuit (PIC) comprising:
   a substrate;
   an optical device layer supported over the substrate including a first waveguide; and
   an edge coupler, located above the optical device layer, comprising a plurality of waveguide cores located on a plurality of waveguide layers, the plurality of waveguide cores configured to adapt a beam of light between a larger mode size at an outer end of the edge coupler and a smaller mode size at an inner end of the edge coupler optically coupled to the first waveguide;
   wherein at least one of the plurality of waveguide cores expands from the inner end to the outer end of the edge coupler; and
   wherein one or more of the plurality of waveguide cores, that do not expand, comprise a larger pitch near the outer end of the edge coupler than near the inner end of the edge coupler.

5. The PIC according to claim 4, wherein the at least one of the plurality of waveguide cores that expands from the inner end to the outer end is surrounded by others of the plurality of waveguide cores.

6. The PIC according to claim 4, wherein one or more of a remaining waveguide cores taper down towards the outer end of the edge coupler.

7. The PIC according to claim 6, wherein one or more of the waveguide cores near edges of a surface transverse to a propagation direction of illumination in the edge coupler, taper down towards the outer end of the edge coupler.

8. The PIC according to claim 6, wherein one or more of the waveguide cores remain unchanged from the inner end to the outer end of the edge coupler.

9. The PIC according to claim 1, wherein each of the waveguide cores has a same material composition.

10. The PIC according to claim 1, wherein at least one of the waveguide cores is comprised of a different material at the inner end than at the outer end to provide a different index of refraction.

11. The PIC according to claim 1, wherein each waveguide core has a thickness and a width smaller than half of λ/n, wherein λ is a wavelength of the beam of light, and n is a refractive index of the waveguide core.

12. The PIC according to claim 1, wherein the plurality of waveguide cores is confined to a pre-determined area transverse to a propagation direction of illumination, wherein the area has a width w and a height h.

13. The PIC according to claim 1, wherein a pitch between at least two of adjacent waveguide cores is tapered from the inner end to the outer end.

14. The PIC according to claim 1, wherein the optical device layer is between the edge coupler and the substrate.

15. The PIC according to claim 1, wherein each waveguide core comprises a dielectric or semiconductor material enabling illumination of a desired wavelength, and wherein the dielectric or semiconductor material is selected from a group consisting of crystalline silicon, poly-silicon, amorphous silicon, silicon, silicon nitride, silicon oxynitride, silicon dioxide, doped silicon dioxide, and a polymer.

* * * * *